United States Patent [19]

Widmann

[11] Patent Number: 5,613,478
[45] Date of Patent: Mar. 25, 1997

[54] DEVICE FOR CONTROLLING THE AIR FLOW OF A SUPERCHARGED INTERNAL COMBUSTION ENGINE

[75] Inventor: Wolfgang Widmann, Erdmannhausen, Germany

[73] Assignee: Mercedes-Benz AG, Stuttgart, Germany

[21] Appl. No.: 638,828

[22] Filed: Apr. 29, 1996

[30] Foreign Application Priority Data

May 2, 1995 [DE] Germany ..................... 195 16 006.1

[51] Int. Cl.$^6$ ........................................ F02B 33/44
[52] U.S. Cl. ...................................... 123/564
[58] Field of Search ............................ 123/559.1, 564

[56] References Cited

FOREIGN PATENT DOCUMENTS

| | | |
|---|---|---|
| 2027883 | 12/1971 | Germany. |
| 2933556 | 3/1981 | Germany. |
| 3506235 | 9/1985 | Germany. |
| 2-119622 | 5/1990 | Japan .................................. 123/564 |
| 4-175457 | 6/1992 | Japan .................................. 123/564 |
| 5-312048 | 11/1993 | Japan .................................. 123/564 |

Primary Examiner—Michael Koczo
Attorney, Agent, or Firm—Evenson McKeown Edwards & Lenahan PLLC

[57] ABSTRACT

The invention relates to a device for controlling the air flow of a supercharged internal combustion engine with a supercharger to deliver charge air from a suction line located upstream of the supercharger through a charge air line located downstream of the supercharger to the internal combustion engine. The suction line includes an intake and a recirculating line with a recirculating valve located between the charge air line and the suction line. The recirculating line between the recirculating valve and the suction line is formed by a line section that terminates in the suction line of the supercharger downstream of the intake. In order to achieve a significant reduction of induction noise, the length of the line section from the recirculating valve to the opening in the suction line is dimensioned as a function of a presettable pulsation frequency of the supercharger so that the line section, with the recirculating valve closed, forms a resonator that is tuned to one or more pulsation frequencies of the supercharger.

8 Claims, 1 Drawing Sheet

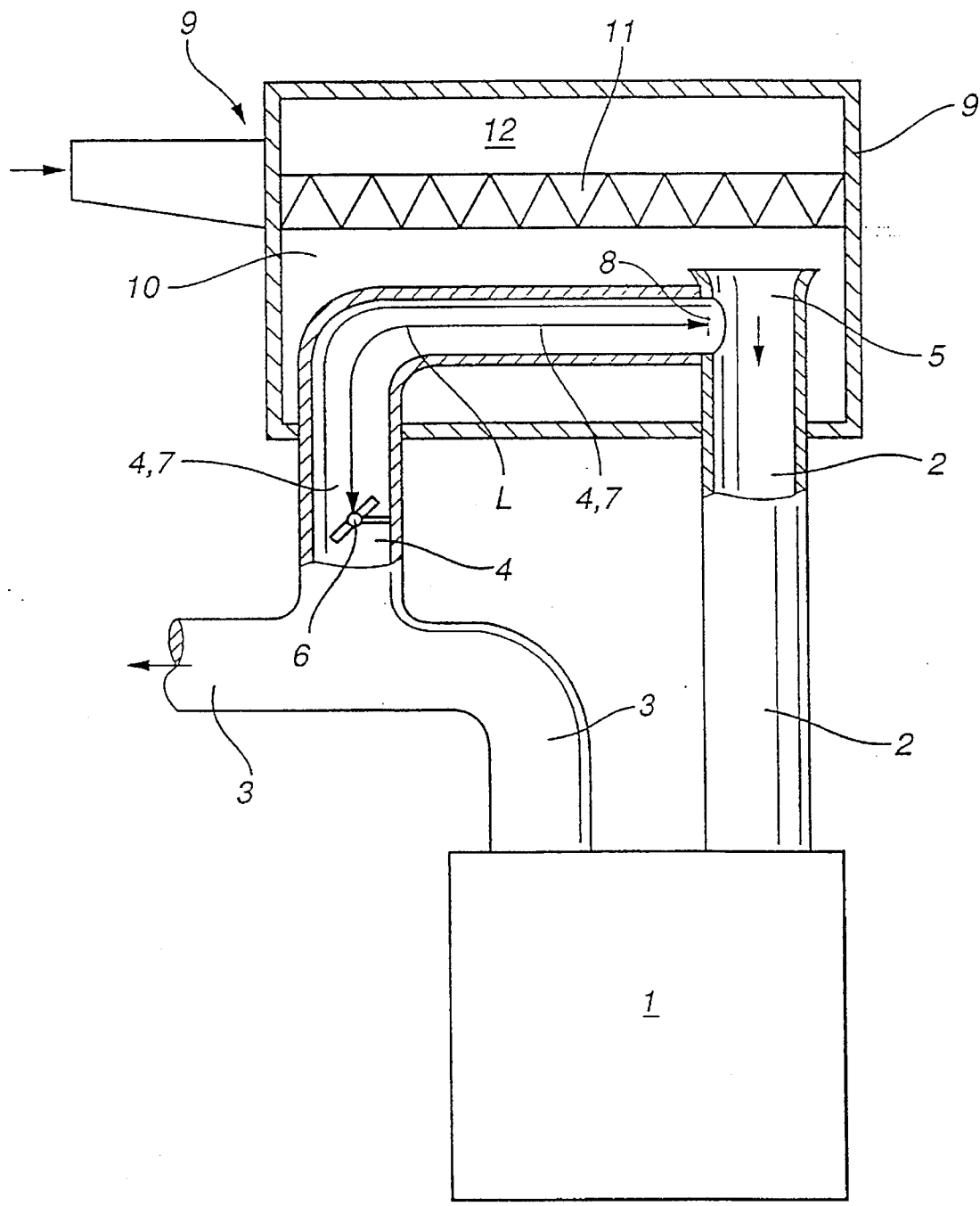

DEVICE FOR CONTROLLING THE AIR FLOW OF A SUPERCHARGED INTERNAL COMBUSTION ENGINE

BACKGROUND AND SUMMARY OF THE INVENTION

The invention relates to a device for controlling the air flow of a supercharged internal- combustion engine with a supercharger to deliver charge air from a suction line located upstream of the supercharger through a charge air line located downstream of the supercharger to the internal combustion engine, with the suction line comprising an intake and a recirculating line including a recirculating valve being located between the charge air line and the suction line, and with the recirculating line between the recirculating valve and the suction line being formed by a line section that terminates downstream of the intake in the suction line of the supercharger A device for controlling the air flow of a supercharged internal combustion engine of the above-mentioned general type is already known from German Patent Document DE 35 06 235 A1. The device comprises a supercharger to deliver charge air from a suction line located upstream of the supercharger through a charging air line located downstream of the supercharger to the internal combustion engine, with the suction line comprising an intake and a recirculation line with a recirculating valve being provided between the charge air line and the suction line. The recirculating line is composed of a line section between the recirculating valve and the suction line, said section terminating downstream of the intake in the suction line of the supercharger.

Reference is made to German Patent Documents DE-OS 20 27 883 and DE 29 33 556 C2 for general technical background.

One disadvantage of devices of the general type referred to above is their relatively high induction noise level. Although the noise generated by the flow deflection at the intake itself is usually sharply reduced by a flow-favorable design of the intake, in mechanically supercharged internal combustion engines for example an unsatisfactorily high induction noise remains, produced primarily by pressure pulsations on the intake side of the supercharger.

The invention is based on the object of designing a device of the above-mentioned type in such fashion that a considerable reduction of the induction noise can be achieved.

This goal is achieved according to the invention by providing an arrangement wherein, in order to reduce induction noise, a length of line section from the recirculating valve to the opening in the suction line is dimensioned so that the line section with the recirculating valve closed forms a resonator that is tuned to one or more pulsation frequencies of the supercharger.

One advantage of the device according to the invention consists in the fact that a significant reduction of the induction noise is achieved by adjusting the length of the line section, which depends on a pulsation frequency of the supercharger, from the recirculating valve to the opening into the intake line in such fashion that the line section, with the recirculating valve closed, forms a resonator tuned to one or more pulsation frequencies. Thus, during full-load operation, the recirculating valve is completely closed. The total air volume is drawn through the intake in the air filter. The line section thus constitutes a closed connection to the recirculating valve and, by adjusting the length of the line section to the pulsation frequency of the supercharger, an effect is obtained such that the line section acts as a bypass resonator that sharply dampens the pulsations of the supercharger.

With a partially or completely closed recirculating valve, the line section no longer acts as a resonator but as an induction noise damper. As a result, a much improved reduction of the induction noise is achieved by the device according to the invention even during partial load operation, with the recirculating valve partially or completely open.

In preferred embodiments of the invention the recirculating line and recirculating valve are supported in a filter housing which also houses the intake end of the intake line.

Other objects, advantages and novel features of the present invention will become apparent from the following detailed description of the invention when considered in conjunction with the accompanying drawings.

BRIEF DESCRIPTION OF THE DRAWINGS

The single drawing figure is a schematic part sectional view of an air intake assembly constructed according to a preferred embodiment of the invention.

DETAILED DESCRIPTION OF THE DRAWINGS

In the single figure, the invention is explained in greater detail with reference to the schematic diagram. It shows a device for controlling the air flow of an internal combustion engine which is supercharged and not shown. A supercharger delivers charge air from an intake line 2 through a charge air line 3 to the internal combustion engine. Intake line 2 and intake 5 are located upstream from supercharger 1 and charge air line 3 is located downstream from the supercharger. Supercharger 1 is a mechanical supercharger driven by the internal combustion engine through a V-belt connection, not shown.

Downstream of supercharger 1, a bypass line 4 runs from charge air line 3 to intake line 2, with a recirculating valve 6 being located in recirculating line 4. Recirculating line 4 between recirculating valve 6 and intake line 2 consists of a line section 7 that terminates downstream of intake 5 at an opening 8 in intake line 2 of supercharger 1.

In the example shown, intake 5 and line section 7 are located in an air filter housing 9 of the internal combustion engine, with intake 5 and line section 7 being located on a clean air side 10 of an air filter 11, which separates a raw air side 12 from clean air side 10 in air filter housing 9. Line section 7 therefore is connected only by its opening 8 and intake 5 of suction line 2 with clean air side 10 of air filter 11.

To reduce the induction noise of intake 5, a length L of line section 7 from recirculating valve 6 to opening 8 in intake line 2 is dimensioned as a function of a predeterminable pulsation frequency of supercharger 1, so that line section 7 forms a resonator (bypass resonator) when recirculating valve 6 is closed, said resonator being tuned to one or more pulsation frequencies of supercharger 1. In a mechanical supercharger, the pulsation frequency of the pulsation oscillations of the supercharger is determined by the number of chamber discharges of the supercharger per supercharger revolution. Preferably, length L is tuned to a wave-shaped pulsation oscillation of supercharger 1 in such fashion that opening 8 of line section 7 (=opening of resonator) is located in the vicinity of a wave peak of the pulsation oscillation of supercharger 1.

In order to achieve a reduction of induction noise that is as optimal as possible, intake 5 is integrated into air filter housing 9. Preferably, line section 7 is also located in air filter housing 9 and recirculating valve 6 is mounted on air filter housing 9.

Line section 7 however can also be located outside air filter housing 9 according to other contemplated embodiments of the invention. In addition, the invention is not limited to a mechanical supercharger but can also be used for other types of superchargers.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for controlling the air flow of a supercharged internal combustion engine with a supercharger to deliver charge air from a suction line located upstream of the supercharger through a charge air line located downstream of the supercharger to the internal combustion engine, with the suction line comprising an intake and a recirculating line including a recirculating valve being located between the charge air line and the suction line, and with the recirculating line between the recirculating valve and the suction line being formed by a line section that terminates downstream of the intake in the suction line of the supercharger, wherein, in order to reduce induction noise, a length of line section from the recirculating valve to the opening in the suction line is dimensioned so that the line section with the recirculating valve closed forms a resonator that is tuned to one or more pulsation frequencies of the supercharger.

2. Device according to claim 1, wherein the intake and the line section are located in an air filter housing of the internal combustion engine.

3. Device according to claim 1, wherein the recirculating valve is mounted on the air filter housing.

4. Device according to claim 3, wherein the intake and the line section are located in an air filter housing of the internal combustion engine.

5. Apparatus for supplying air flow to an internal combustion engine, comprising:

a supercharger, an air intake line disposed upstream of the supercharger, said intake line having an intake opening at its upstream end, an engine charge air line disposed downstream of the supercharger, a recirculating line connecting the intake line with the charge air line, and a recirculating valve in said recirculating line, wherein said recirculating line opens into said intake line at a position downstream of the intake opening and into said charge air line at a position downstream of the supercharger, and wherein the recirculating line has a predetermined size section between the intake line and the recirculating valve which is configured to form a resonator tuned to at least one pulsating frequency of the supercharger when the recirculating valve is closed.

6. Apparatus according to claim 5, wherein the intake and the line section are located in an air filter housing of the internal combustion engine.

7. Apparatus according to claim 5, wherein the recirculating valve is mounted on the air filter housing.

8. Apparatus according to claim 5, wherein said predetermined size section is an L-shaped pipe section.

\* \* \* \* \*